(12) United States Patent
Zampini

(10) Patent No.: US 10,060,599 B2
(45) Date of Patent: Aug. 28, 2018

(54) SYSTEMS, METHODS AND APPARATUS FOR PROGRAMMABLE LIGHT FIXTURES

(71) Applicant: Integrated Illumination Systems, Inc., Morris, CT (US)

(72) Inventor: Mark Alphonse Zampini, Morris, CT (US)

(73) Assignee: Integrated Illumination Systems, Inc., Morris, CT (US)

( * ) Notice: Subject to any disclaimer, the term of this patent is extended or adjusted under 35 U.S.C. 154(b) by 0 days.

(21) Appl. No.: 15/166,552

(22) Filed: May 27, 2016

(65) Prior Publication Data

US 2016/0348875 A1 Dec. 1, 2016

Related U.S. Application Data

(60) Provisional application No. 62/168,517, filed on May 29, 2015.

(51) Int. Cl.
*F21S 4/00* (2016.01)
*F21V 7/00* (2006.01)
(Continued)

(52) U.S. Cl.
CPC ............ *F21V 7/0008* (2013.01); *F21S 8/033* (2013.01); *F21V 23/003* (2013.01);
(Continued)

(58) Field of Classification Search
CPC .............. F21Y 2115/10; F21Y 2103/10; F21Y 2103/00; F21Y 2113/00; F21Y 2101/00;
(Continued)

(56) References Cited

U.S. PATENT DOCUMENTS 4,139,770 A 2/1979 Beyersdorf
5,264,997 A 11/1993 Hutchisson et al.
(Continued)

FOREIGN PATENT DOCUMENTS

WO WO-03/017733 A1 2/2003

OTHER PUBLICATIONS

"1-Wire Products Deliver a Powerful Combination . . . ", Mixed-Signal Design Guide, Dallas Semiconductor Maxim, 2005, 7 pages.
(Continued)

*Primary Examiner* — Thien M Le
(74) *Attorney, Agent, or Firm* — Foley & Lardner LLP

(57) ABSTRACT

The present disclosure provides a light fixture attached to a wall or a ceiling to illuminate at least a portion of the ceiling. The light fixture can include a light source enclosed within the light fixture and configured to emanate light directionally away from the wall. The light fixture can include a protrusion. The protrusion can extend away from and below the light source. The protrusion can include a bent end that is bent upwards to direct light at a predetermined angle towards a ceiling. The light fixture can include an optic attached above the light source and extending above and externally towards the bent end of the protrusion. The optic can be configured to direct a portion of light towards the bent end.

20 Claims, 7 Drawing Sheets

(51) Int. Cl.
  *F21S 8/00* (2006.01)
  *H05B 33/08* (2006.01)
  *F21V 23/00* (2015.01)
  *F21S 8/04* (2006.01)
  *F21V 7/22* (2018.01)
  *F21Y 103/10* (2016.01)
  *F21Y 115/10* (2016.01)

(52) U.S. Cl.
  CPC ..... *H05B 33/0845* (2013.01); *H05B 33/0884* (2013.01); *F21S 8/04* (2013.01); *F21V 7/005* (2013.01); *F21V 7/22* (2013.01); *F21Y 2103/10* (2016.08); *F21Y 2115/10* (2016.08); *Y02B 20/343* (2013.01)

(58) Field of Classification Search
  CPC .............. F21Y 2105/00; F21Y 2115/15; F21Y 2115/20; F21S 8/026; F21S 8/04; F21S 8/033; F21S 8/036; F21S 10/00; F21S 4/28
  USPC .......................................................... 362/223
  See application file for complete search history.

(56) References Cited

U.S. PATENT DOCUMENTS

| | | |
|---|---|---|
| 5,465,199 A | 11/1995 | Bray et al. |
| 5,561,346 A | 10/1996 | Byrne |
| 5,783,909 A | 7/1998 | Hochstein |
| 5,803,579 A | 9/1998 | Turnbull et al. |
| 5,909,429 A | 6/1999 | Satyanarayana et al. |
| 5,947,587 A | 9/1999 | Keuper et al. |
| 6,013,988 A | 1/2000 | Bucks et al. |
| 6,016,038 A | 1/2000 | Mueller et al. |
| 6,040,663 A | 3/2000 | Bucks et al. |
| 6,094,014 A | 7/2000 | Bucks et al. |
| 6,127,783 A | 10/2000 | Pashley et al. |
| 6,147,458 A | 11/2000 | Bucks et al. |
| 6,150,774 A | 11/2000 | Mueller et al. |
| 6,157,093 A | 12/2000 | Giannopoulos et al. |
| 6,166,496 A | 12/2000 | Lys et al. |
| 6,194,839 B1 | 2/2001 | Chang |
| 6,201,353 B1 | 3/2001 | Chang et al. |
| 6,211,626 B1 | 4/2001 | Lys et al. |
| 6,234,645 B1 | 5/2001 | Borner et al. |
| 6,234,648 B1 | 5/2001 | Borner et al. |
| 6,236,331 B1 | 5/2001 | Dussureault |
| 6,238,065 B1 | 5/2001 | Jones |
| 6,249,088 B1 | 6/2001 | Chang |
| 6,250,774 B1 | 6/2001 | Begemann et al. |
| 6,253,530 B1 | 7/2001 | Price et al. |
| 6,288,497 B1 | 9/2001 | Chang et al. |
| 6,292,901 B1 | 9/2001 | Lys et al. |
| 6,299,329 B1 | 10/2001 | Mui et al. |
| 6,304,464 B1 | 10/2001 | Jacobs et al. |
| 6,305,818 B1 | 10/2001 | Lebens et al. |
| 6,340,864 B1 | 1/2002 | Wacyk |
| 6,340,868 B1 | 1/2002 | Lys et al. |
| 6,384,545 B1 | 5/2002 | Lau |
| 6,411,046 B1 | 6/2002 | Muthu |
| 6,441,558 B1 | 8/2002 | Muthu et al. |
| 6,443,592 B1 | 9/2002 | Unger et al. |
| 6,445,139 B1 | 9/2002 | Marshall et al. |
| 6,459,919 B1 | 10/2002 | Lys et al. |
| 6,489,731 B1 | 12/2002 | Bruning et al. |
| 6,495,964 B1 | 12/2002 | Muthu et al. |
| 6,507,158 B1 | 1/2003 | Wang |
| 6,507,159 B2 | 1/2003 | Muthu |
| 6,510,995 B2 | 1/2003 | Muthu et al. |
| 6,513,949 B1 | 2/2003 | Marshall et al. |
| 6,528,954 B1 | 3/2003 | Lys et al. |
| 6,552,495 B1 | 4/2003 | Chang |
| 6,576,881 B2 | 6/2003 | Muthu et al. |
| 6,577,080 B2 | 6/2003 | Lys et al. |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,609,813 B1 | 8/2003 | Showers et al. |
| 6,617,795 B2 | 9/2003 | Bruning |
| 6,621,235 B2 | 9/2003 | Chang |
| 6,630,801 B2 | 10/2003 | Schuurmans |
| 6,636,003 B2 | 10/2003 | Rahm et al. |
| 6,639,368 B2 | 10/2003 | Sheoghong |
| 6,676,284 B1 | 1/2004 | Wynne Willson |
| 6,692,136 B2 | 2/2004 | Marshall et al. |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,762,562 B2 | 7/2004 | Leong |
| 6,777,891 B2 | 8/2004 | Lys et al. |
| 6,788,011 B2 | 9/2004 | Mueller et al. |
| 6,796,680 B1 | 9/2004 | Showers et al. |
| 6,796,686 B2 | 9/2004 | Jacob et al. |
| 6,801,003 B2 | 10/2004 | Schanberger et al. |
| 6,806,659 B1 | 10/2004 | Mueller et al. |
| 6,831,569 B2 | 12/2004 | Wang et al. |
| 6,853,150 B2 | 2/2005 | Clauberg et al. |
| 6,853,151 B2 | 2/2005 | Leong et al. |
| 6,859,644 B2 | 2/2005 | Wang |
| 6,922,022 B2 | 7/2005 | Bucks et al. |
| 6,930,452 B2 | 8/2005 | De Krijger et al. |
| 6,932,477 B2 | 8/2005 | Stanton |
| 6,933,685 B2 | 8/2005 | Gutta et al. |
| 6,933,767 B2 | 8/2005 | Bucks et al. |
| 6,965,205 B2 | 11/2005 | Piepgras et al. |
| 6,969,954 B2 | 11/2005 | Lys |
| 6,972,525 B2 | 12/2005 | Bucks et al. |
| 6,975,079 B2 | 12/2005 | Lys et al. |
| 6,992,803 B2 | 1/2006 | Chang |
| 6,998,594 B2 | 2/2006 | Gaines et al. |
| 7,014,336 B1 | 3/2006 | Ducharme et al. |
| 7,030,572 B2 | 4/2006 | Nijhof et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,064,498 B2 | 6/2006 | Dowling et al. |
| 7,067,992 B2 | 6/2006 | Leong et al. |
| 7,071,762 B2 | 7/2006 | Xu et al. |
| 7,113,541 B1 | 9/2006 | Lys et al. |
| 7,118,248 B2 | 10/2006 | Wynne Willson |
| 7,132,804 B2 | 11/2006 | Lys et al. |
| 7,135,824 B2 | 11/2006 | Lys et al. |
| 7,139,617 B1 | 11/2006 | Morgan et al. |
| 7,140,752 B2 | 11/2006 | Ashdown |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,608 B2 | 4/2007 | Robinson et al. |
| 7,202,613 B2 | 4/2007 | Morgan et al. |
| 7,202,641 B2 | 4/2007 | Claessens et al. |
| 7,204,622 B2 | 4/2007 | Dowling et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,253,566 B2 | 8/2007 | Lys et al. |
| 7,255,457 B2 | 8/2007 | Ducharme et al. |
| 7,255,458 B2 | 8/2007 | Ashdown |
| 7,256,554 B2 | 8/2007 | Lys |
| 7,262,559 B2 | 8/2007 | Tripathi et al. |
| 7,267,461 B2 | 9/2007 | Kan et al. |
| 7,274,160 B2 | 9/2007 | Mueller et al. |
| 7,300,192 B2 | 11/2007 | Mueller et al. |
| 7,308,296 B2 | 12/2007 | Lys et al. |
| 7,309,965 B2 | 12/2007 | Dowling et al. |

(56) References Cited

U.S. PATENT DOCUMENTS

| | | |
|---|---|---|
| 7,314,289 B2 | 1/2008 | Montagne |
| 7,319,298 B2 | 1/2008 | Jungwirth et al. |
| 7,323,676 B2 | 1/2008 | Duijve |
| 7,329,998 B2 | 2/2008 | Jungwirth |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,929 B2 | 4/2008 | Mueller et al. |
| 7,358,961 B2 | 4/2008 | Zwanenburg |
| 7,387,405 B2 | 6/2008 | Ducharme et al. |
| 7,388,665 B2 | 6/2008 | Ashdown |
| 7,394,210 B2 | 7/2008 | Ashdown |
| 7,420,335 B2 | 9/2008 | Robinson et al. |
| 7,423,387 B2 | 9/2008 | Robinson et al. |
| 7,432,668 B2 | 10/2008 | Zwanenburg et al. |
| 7,443,209 B2 | 10/2008 | Chang |
| 7,449,847 B2 | 11/2008 | Schanberger et al. |
| 7,453,217 B2 | 11/2008 | Lys et al. |
| 7,459,864 B2 | 12/2008 | Lys |
| 7,462,997 B2 | 12/2008 | Mueller et al. |
| 7,463,070 B2 | 12/2008 | Wessels |
| 7,482,565 B2 | 1/2009 | Morgan et al. |
| 7,482,760 B2 | 1/2009 | Jungwirth et al. |
| 7,490,953 B2 | 2/2009 | Holten et al. |
| 7,490,957 B2 | 2/2009 | Leong et al. |
| 7,495,671 B2 | 2/2009 | Chemel et al. |
| 7,502,034 B2 | 3/2009 | Chemel et al. |
| 7,505,395 B2 | 3/2009 | Ashdown et al. |
| 7,507,001 B2 | 3/2009 | Kit |
| 7,511,436 B2 | 3/2009 | Xu |
| 7,511,437 B2 | 3/2009 | Lys et al. |
| 7,515,128 B2 | 4/2009 | Dowling |
| 7,520,634 B2 | 4/2009 | Ducharme et al. |
| 7,521,872 B2 | 4/2009 | Bruning |
| 7,525,254 B2 | 4/2009 | Lys et al. |
| 7,538,499 B2 | 5/2009 | Ashdown |
| 7,542,257 B2 | 6/2009 | McCormick et al. |
| 7,550,931 B2 | 6/2009 | Lys et al. |
| 7,550,935 B2 | 6/2009 | Lys et al. |
| 7,557,521 B2 | 7/2009 | Lys |
| 7,569,807 B2 | 8/2009 | Matheson |
| 7,572,028 B2 | 8/2009 | Mueller et al. |
| 7,573,209 B2 | 8/2009 | Ashdown et al. |
| 7,573,210 B2 | 8/2009 | Ashdown et al. |
| 7,573,729 B2 | 8/2009 | Elferich et al. |
| 7,598,681 B2 | 10/2009 | Lys et al. |
| 7,598,684 B2 | 10/2009 | Lys et al. |
| 7,598,686 B2 | 10/2009 | Lys et al. |
| 7,619,370 B2 | 11/2009 | Chemel et al. |
| 7,652,236 B2 | 1/2010 | Cortenraad et al. |
| 7,654,703 B2 | 2/2010 | Kan et al. |
| 7,656,366 B2 | 2/2010 | Ashdown |
| 7,658,506 B2 | 2/2010 | Dowling |
| 7,659,673 B2 | 2/2010 | Lys |
| 7,659,674 B2 | 2/2010 | Mueller et al. |
| 7,665,883 B2 | 2/2010 | Matheson |
| 7,667,409 B2 | 2/2010 | Geerts et al. |
| 7,675,238 B2 | 3/2010 | Cortenraad et al. |
| 7,687,753 B2 | 3/2010 | Ashdown |
| 7,688,002 B2 | 3/2010 | Ashdown et al. |
| 7,689,130 B2 | 3/2010 | Ashdown |
| 7,703,951 B2 | 4/2010 | Piepgras et al. |
| 7,710,369 B2 | 5/2010 | Dowling |
| 7,712,926 B2 | 5/2010 | Matheson |
| 7,714,521 B2 | 5/2010 | Qian |
| 7,731,387 B2 | 6/2010 | Cortenraad et al. |
| 7,731,389 B2 | 6/2010 | Draganov et al. |
| 7,731,390 B2 | 6/2010 | Van Gorkom et al. |
| 7,737,643 B2 | 6/2010 | Lys |
| 7,738,002 B2 | 6/2010 | Ashdown et al. |
| 7,740,375 B2 | 6/2010 | Zou et al. |
| 7,766,489 B2 | 8/2010 | Duine et al. |
| 7,766,518 B2 | 8/2010 | Piepgras et al. |
| 7,772,787 B2 | 8/2010 | Ashdown et al. |
| 7,777,427 B2 | 8/2010 | Stalker, III |
| 7,781,979 B2 | 8/2010 | Lys |
| 7,802,902 B2 | 9/2010 | Moss et al. |
| 7,806,558 B2 | 10/2010 | Williamson |
| 7,808,191 B2 | 10/2010 | Wu |
| 7,809,448 B2 | 10/2010 | Lys et al. |
| 7,810,974 B2 | 10/2010 | Van Rijswick et al. |
| 7,845,823 B2 | 12/2010 | Mueller et al. |
| 7,850,347 B2 | 12/2010 | Speier et al. |
| 7,854,539 B2 | 12/2010 | Van Duijneveldt |
| 7,868,562 B2 | 1/2011 | Salsbury et al. |
| 7,878,683 B2 | 2/2011 | Logan et al. |
| 7,878,688 B2 | 2/2011 | Paulussen et al. |
| 7,893,631 B2 | 2/2011 | Speier |
| 7,893,661 B2 | 2/2011 | Ackermann et al. |
| 7,894,050 B2 | 2/2011 | Ashdown et al. |
| 7,906,917 B2 | 3/2011 | Tripathi et al. |
| 7,911,151 B2 | 3/2011 | Xu |
| 7,914,173 B2 | 3/2011 | Paulussen et al. |
| 8,022,632 B2 | 9/2011 | Schulz et al. |
| 8,026,673 B2 | 9/2011 | Lys |
| 2002/0074559 A1 | 6/2002 | Dowling et al. |
| 2003/0132721 A1 | 7/2003 | Jacobs et al. |
| 2003/0133292 A1 | 7/2003 | Mueller et al. |
| 2004/0052076 A1 | 3/2004 | Mueller et al. |
| 2004/0090191 A1 | 5/2004 | Mueller et al. |
| 2004/0178751 A1 | 9/2004 | Mueller et al. |
| 2005/0236998 A1 | 10/2005 | Mueller et al. |
| 2005/0275626 A1 | 12/2005 | Mueller et al. |
| 2006/0002110 A1 | 1/2006 | Dowling et al. |
| 2006/0023450 A1* | 2/2006 | Chung ............... F21S 8/02 362/246 |
| 2006/0076908 A1 | 4/2006 | Morgan et al. |
| 2006/0114201 A1 | 6/2006 | Chang |
| 2006/0152172 A9 | 7/2006 | Mueller et al. |
| 2006/0221606 A1 | 10/2006 | Dowling |
| 2006/0262521 A1 | 11/2006 | Piepgras et al. |
| 2006/0274526 A1 | 12/2006 | Weston et al. |
| 2006/0290624 A1 | 12/2006 | Ashdown |
| 2007/0063658 A1 | 3/2007 | Van Der Veeken |
| 2007/0064425 A1* | 3/2007 | Frecska ............... F21S 8/04 362/253 |
| 2007/0086912 A1 | 4/2007 | Dowling et al. |
| 2007/0115658 A1 | 5/2007 | Mueller et al. |
| 2007/0145915 A1 | 6/2007 | Roberge et al. |
| 2007/0153514 A1 | 7/2007 | Dowling et al. |
| 2007/0230159 A1 | 10/2007 | Cortenraad et al. |
| 2007/0258240 A1 | 11/2007 | Ducharme et al. |
| 2007/0273290 A1 | 11/2007 | Ashdown et al. |
| 2008/0042599 A1 | 2/2008 | Ashdown |
| 2008/0043464 A1 | 2/2008 | Ashdown |
| 2008/0048582 A1 | 2/2008 | Robinson |
| 2008/0062413 A1 | 3/2008 | Ashdown et al. |
| 2008/0089060 A1 | 4/2008 | Kondo et al. |
| 2008/0094005 A1 | 4/2008 | Rabiner et al. |
| 2008/0122386 A1 | 5/2008 | De Brouwer et al. |
| 2008/0136331 A1 | 6/2008 | Schmeikal |
| 2008/0136796 A1 | 6/2008 | Dowling |
| 2008/0140231 A1 | 6/2008 | Blackwell et al. |
| 2008/0164826 A1 | 7/2008 | Lys |
| 2008/0164854 A1 | 7/2008 | Lys |
| 2008/0167734 A1 | 7/2008 | Robinson et al. |
| 2008/0183081 A1 | 7/2008 | Lys et al. |
| 2008/0239675 A1 | 10/2008 | Speier |
| 2008/0265797 A1 | 10/2008 | Van Doorn |
| 2008/0278092 A1 | 11/2008 | Lys et al. |
| 2008/0278941 A1 | 11/2008 | Logan et al. |
| 2008/0290251 A1 | 11/2008 | Deurenberg et al. |
| 2008/0297066 A1 | 12/2008 | Meijer et al. |
| 2008/0298330 A1 | 12/2008 | Leitch |
| 2008/0315798 A1 | 12/2008 | Diederiks et al. |
| 2009/0002981 A1 | 1/2009 | Knibbe |
| 2009/0021175 A1 | 1/2009 | Wendt et al. |
| 2009/0021182 A1 | 1/2009 | Sauerlaender |
| 2009/0072761 A1 | 3/2009 | Wessels |

(56) References Cited

U.S. PATENT DOCUMENTS

| | | | |
|---|---|---|---|
| 2009/0128059 A1 | 5/2009 | Joosen et al. | |
| 2009/0134817 A1 | 5/2009 | Jurngwirth et al. | |
| 2009/0160364 A1 | 6/2009 | Ackermann et al. | |
| 2009/0168415 A1 | 7/2009 | Deurenberg et al. | |
| 2009/0179587 A1 | 7/2009 | Van Der Veen et al. | |
| 2009/0179596 A1 | 7/2009 | Willaert et al. | |
| 2009/0189448 A1 | 7/2009 | Verschueren | |
| 2009/0224695 A1 | 9/2009 | Van Erp et al. | |
| 2009/0230884 A1 | 9/2009 | Van Doorn | |
| 2009/0243507 A1 | 10/2009 | Lucero-Vera et al. | |
| 2009/0278473 A1 | 11/2009 | Van Erp | |
| 2009/0284174 A1 | 11/2009 | Sauerlander et al. | |
| 2009/0321666 A1 | 12/2009 | Hilgers | |
| 2010/0007600 A1 | 1/2010 | Deurenberg et al. | |
| 2010/0026191 A1 | 2/2010 | Radermacher et al. | |
| 2010/0045478 A1 | 2/2010 | Schulz et al. | |
| 2010/0072901 A1 | 3/2010 | De Rijck et al. | |
| 2010/0072902 A1 | 3/2010 | Wendt et al. | |
| 2010/0079085 A1 | 4/2010 | Wendt et al. | |
| 2010/0079091 A1 | 4/2010 | Deixler et al. | |
| 2010/0084995 A1 | 4/2010 | Baaijens et al. | |
| 2010/0091488 A1 | 4/2010 | Ijzerman et al. | |
| 2010/0094439 A1 | 4/2010 | Van De Meulenhof et al. | |
| 2010/0102732 A1 | 4/2010 | Peeters et al. | |
| 2010/0117543 A1 | 5/2010 | Van Der Veen et al. | |
| 2010/0117656 A1 | 5/2010 | Snelten | |
| 2010/0118531 A1 | 5/2010 | Montagne | |
| 2010/0127633 A1 | 5/2010 | Geerts et al. | |
| 2010/0134041 A1 | 6/2010 | Radermacher et al. | |
| 2010/0134042 A1 | 6/2010 | Willaert | |
| 2010/0148689 A1 | 6/2010 | Morgan et al. | |
| 2010/0164399 A1 | 7/2010 | Radermacher et al. | |
| 2010/0165618 A1 | 7/2010 | Vissenberg et al. | |
| 2010/0171771 A1 | 7/2010 | Otte et al. | |
| 2010/0181936 A1 | 7/2010 | Radermacher et al. | |
| 2010/0188007 A1 | 7/2010 | Deppe et al. | |
| 2010/0194293 A1 | 8/2010 | Deurenberg et al. | |
| 2010/0226116 A1* | 9/2010 | Brainard | F21V 13/04 362/84 |
| 2010/0231133 A1 | 9/2010 | Lys | |
| 2010/0231363 A1 | 9/2010 | Knibbe | |
| 2010/0244707 A1 | 9/2010 | Gaines et al. | |
| 2010/0244734 A1 | 9/2010 | Van Herpen et al. | |
| 2010/0254146 A1* | 10/2010 | McCanless | F21V 29/745 362/368 |
| 2010/0259182 A1 | 10/2010 | Man et al. | |
| 2010/0264834 A1 | 10/2010 | Gaines et al. | |
| 2010/0271843 A1 | 10/2010 | Holten et al. | |
| 2010/0289532 A1 | 11/2010 | Wendt et al. | |
| 2010/0301780 A1 | 12/2010 | Vinkenvleugel | |
| 2010/0308745 A1 | 12/2010 | Delnoij | |
| 2011/0025205 A1 | 2/2011 | Van Rijswick et al. | |
| 2011/0025230 A1 | 2/2011 | Schulz et al. | |
| 2011/0035404 A1 | 2/2011 | Morgan et al. | |
| 2011/0042554 A1 | 2/2011 | Hilgers et al. | |
| 2011/0090684 A1 | 4/2011 | Logan et al. | |
| 2011/0095694 A1 | 4/2011 | Justel et al. | |
| 2011/0285292 A1 | 11/2011 | Mollnow et al. | |
| 2011/0291812 A1 | 12/2011 | Verbrugh | |
| 2012/0019670 A1 | 1/2012 | Chang et al. | |
| 2012/0113442 A1* | 5/2012 | Kyung | H04N 1/506 358/1.9 |
| 2012/0257383 A1* | 10/2012 | Zhang | F21S 2/005 362/235 |
| 2014/0355272 A1* | 12/2014 | Chou | F21S 4/008 362/308 |
| 2016/0102846 A1* | 4/2016 | Clifford | H05B 37/0218 315/153 |

OTHER PUBLICATIONS

"Conductivity with the BS2/OWL2", EME Systems, 2002, pp. 1-3.
"Dimmable Fluorescent Ballast", ATAVRFBKIT/EVLB001, User Guide, ATMEL, 2007, 35 pages.
"Understanding Boost Power Stages in Switchmode Power Supplies", Application Report, Texas Instruments, Mixed Signal Products, Mar. 1999, 32 pages.
"Understanding Buck Power Stages in Switchmode Power Supplies", Application Report, Texas Instruments, Mixed Signal Products, Mar. 1999, 36 pages.
Barberis, C. "Precision current sink costs less than $20", EDN Design Ideas, 43(6), 1998, 2 pages.
Bellcomb Technologies Incorporated, "Edges, Joiners, Attachments", Web Address: http://www.bellcomb.com/caps/edges.htm, Apr. 22, 2007, pp. 1-3.
Bookmarks Menu—Controllers/Wireless—Deisgn Ideas, dated Dec. 6, 2012, 1 pg.
Bowling, S. "Buck-Boost LED Driver Using the PIC16F785 MCU", Microchip, AN1047, 2006, pp. 1-12.
By Staff, Dali Delivers Control and Cost Savings, Headaches Too, Consulting-Specifying Engineer, Jun. 2002, 2 pages.
Canny, D. "Controlling slew times tames EMI in offline supplies", EDN Design Ideas, Nov. 14, 2002.
Control Freak Addict Data Sheet, Copyright 2008, Creative Lighting, 5 pages.
Curtis, K. "High Power IR LED Driver Using the PIC16C781/782", Microchip, TB062, 2002, pp. 1-8.
CybroTech, Managing Lights with Dali, TN-012, rev 2, Cybrotech Ltd., 2007, 11 pgs.
Cypress Perform, Implementing an Integrated DMX512 Receiver, Item ID: 39762, Dec. 16, 2009, 1 pg.
Cypress Semiconductor Corporation, PowerPSoC (R) Intelligent LED Driver, Document No. 001-46319, Rev. *G, 2009, 52 pages.
Dali-AG website, Dali at work, 1 pg., last update Apr. 8, 2010.
Davidovic, et al., Lead-Acid Battery Charger Becomes a Subfuction in a Microcontroller, The Authority on Emerging Technologies for Design Solutions, Mar. 2007, 2 pages.
Davmark Ltd., Dali-Protocol, 2007, 6 pages.
Di Jasio, "A Technique to Increase the Frequency Resolution of PICmicro MCU PWM Modules", Microchip, AN1050, 2006, pp. 1-10.
Dietz, et al. "Very Low-Cost Sensing and Communication Using Bidirectional LEDs", Mitsubishi Electric Research Laboratories, Jul. 2003, 19 pgs.
Distler, T. "LED Effects Stream TM v2.0 Protocol (Revision C)", Jun. 2, 2005, pp. 1-5.
Dunn, J. "Matching MOSFET Drivers to MOSEFTs", Microchip, AN799, 2004, pp. 1-10.
Fosler, R. "The RS-232/DALI Bridge Interface", Microchip, AN811, 2002, pp. 1-8.
Fosler, R. "Use a microcontroller to design a boost converter", EDN design ideas, Mar. 4, 2004, pp. 74-75.
Fosler, R., et al. "Digitally Addressable DALI Dimming Ballast", Microchip, AN809, 2002, pp. 1-18.
Ghulyani, L. "Simple MPPT-Based Lead Acid Charger Using bq2031", Texas Instruments, Dec. 2009, pp. 1-5.
Goder, D. "Scheme provides high-side current sensing for white-LED drivers", EDN, 1 page, Feb. 19, 2004.
Google Search Results for dali query group, search completed on Apr. 8, 2010, accessed at google.com, http://www.google.com/search?hl=en&client=firefox-a&rls=org.mozilla:en-, 2 pages.
Hardwick, M. "DC power wire also carries clock or data", EDN Design Ideas, Mar. 13, 1998, 1 page.
Hexcel Composites, "Sandwich Panel Fabrication Technology", Web Address: http://www.hexcel.com/NR/rdonlyres/B4574C2C-0644-43AC-96E2-CC15967A4b)5/4547 Sandwich Fabrication.pdf, Jan. 1997, pp. 1-16.
High-Side Current Monitor, ZETEX, Apr. 2001, ZXCT1009, Issue 3, pp. 1-8.
Implementing Infrared Object Detection, http://web.archive.org/web/20080528042614rejwww.seattlerobotics.org/guide/infrared.html, original publication date known, retrieved Apr. 7, 2010, seattlerobotics.org, 4 pages.
Jackson, S. "Circuit protects bus from 5V swings", EDN Design Ideas, Nov. 14, 2002, pp. 102.

(56) References Cited

OTHER PUBLICATIONS

Klepin, K. "Temperature Compensation for High Brightness LEDs using EZ-Color (TM) and PSoC Express", Cypress Perform, AN14406, Aug. 10, 2007, pp. 1-4.
Kremin, V. et al. "Multichannel LED Dimmer with CapSense Control—AN13943", Cypress Perform, Jul. 20, 2007, 5 pages.
Kropf, B. "Firmware—RGB Color Mixing Firmware for EZ-Color (TM)—AN16035", Cypress Perform, Jun. 13, 2007, pp. 1-7.
Lager, A. "Use a 555 timer as a switch-mode power supply", EDN Design Ideas, Nov. 14, 2002, 1 page.
Lee, M. Shunt Battery Charger Provides 1A Continuous Current, EDN Magazine, 1997.
Locher, R. "Introduction to Power MOSEFETs and their Applications", Fairchild Semiconductor (TM), Application Note 558, Rev B, Oct. 1998, 15 pgs.
McArthur, R., "Making Use of Gate Charge to Design the Gate Drive Circuit for Power MOSEFETs and IGBTs data sheets", International Rectifier, Application Note AN-944, Advanced Power Technology, 5 pgs., 2001.
Miller, R. "Digital addressable lighting interface protocol fosters systems interoperability for lower costs and greater design flexibility", RNM Engineering, Inc., Apr. 2003, pp. 1-20.
Nell, S. "VCO uses programmable logic", EDN Design Ideas, Nov. 14, 2002, 1 page.
News & Events Dali Digital addressable lighting interface lamp luminaire control, accessed at http://www.dali-ag.org/ on Apr. 8, 2010, original publication date unknown, updated Apr. 8, 2010, 1 pg.
O'Loughlin, M. "350-W, Two-Phase Interleaved PFC Pre-regulator Design Review", Texas Instruments, Application Report, Revised Mar. 2007, 21 pages.
O'Loughlin, M., PFC Pre-Regulator Frequency Dithering Circuit, Texas Instruments, May 2007, pp. 1-8.
Perrin, R. Inexpensive Relays Form Digital Potentiometer, EDN Design Ideas, 1998, 2 pages.
Petersen, A. "Harness solar power with smart power-conversion techniques", EDN, Green Electronics designfeature, Feb. 4, 1999, pp. 119-124.
Prendergast, P. "How to Design a Three-Channel LED Driver", Cypress Perform, Jan. 2008, pp. 1-9.
Renesas, R8C/25 Demonstration Example for DALI Lighting Protocol Stack, REU05B0077-0100/Rev. 1.00, Jul. 2008, 14 pgs.
Richardson, C., Matching Driver to LED, National Semiconductor, Jan. 2008, 5 pgs.
Richardson. C., LM3404 Driving a Seoul Semi Zpower P4 1A LED-RD-134, National Semiconductor, Apr. 2007, 6 pages.
Shanmugam, S. "Design of a linear Fresnel lens system for solar photovoltaic electrical power source", Proc. SPIE 4572, Intelligent Robots and Computer Vision XX: Algorithms, Techniques, and Active Vision, 556, Oct. 5, 2001, 8 pages.
Shill, M. "Simple logic probe uses bicolor LED", EDN Design Ideas, Mar. 13, 1998, 2 pages.
Software Design Specification, Z-Wave Protocol Overview, Z wave the wireless language, Zensys A/S, May 9, 2007, 20 pages.
Soundlight, Operating Manual, DALI and DMX Dekoder 7064A-H Mk1, 2008, 8 pgs.
Takahashi A., Methods and Features of LED Drivers, National Semiconductor, Mar. 2008, 3 pgs.
Universal Powerline Bus Communication Technology, Overview, PCS Powerline Control Systems UPB (Universal Powerline Bus), Jan. 8, 2002, pp. 1-13.
UPB Technology Description, PCS—Powerline Control Systems, UPB (Universal Powerline Bus), Version 1.4, Apr. 16, 2007, 68 pages.
Van Dorsten, Arian, A Low Cost Step-up Converter by IC 555, posted Jul. 21, 2007, http://www.eleccircuit.comla-low-cost-step-up-converter-by-ic-5551, retrieved Apr. 7, 2010, 2 pages.
Walma, K., DALI: Forerunner of Today's Breakthrough Lighting Technology, Feb. 2007, 2 pages.
Wikipedia, Digital Addressable Lighting Interface, original publication date unknown, Retrieved from:Retrieved from "http://en.wikipedia.org/wikiJDigital_Addressable_Lighting_Interface" accessed on Apr. 8, 2010, 3 pages.
Witt, J. "Switched-capacitor regulator provides gain", EDN Design Ideas, Mar. 13, 1998, 2 pages.
Wojslaw, C. "DPP adds versatility to VFC", EDN, design ideas, Nov. 14, 2002, 1 page.
Young, R. "Power circuit terminates DDR DRAMs", EDN Design Ideas, Nov. 14, 2002, 1 page.
Zarr, R. Driving High-Power LEDs, Machine Design, Oct. 2007, 3 pages.
Zensys ASCII Interface, VIZIA, 2007, 12 pages.
Z-Wave Vizia Etc thread, retrieved at http://groups.google.com/group/comp.home.automation/browse_thread/thread/449c2c66934dfSfb/fSI12116a8231aa1 ?Ink=st&q=z-wave&rnum=98#fSl12116—a8231aa1, www.ztech.com, 18 pages, 2007.

* cited by examiner

SYSTEMS, METHODS AND APPARATUS FOR PROGRAMMABLE LIGHT FIXTURES

CROSS-REFERENCES TO RELATED APPLICATIONS

This application claims priority to, and the benefit of, U.S. Provisional Application No. 62/168,517, filed May 29, 2015, which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE INVENTION

The present application is generally related to programmable light fixtures.

BACKGROUND

Light fixtures may be designed to meet certain design specifications based on an application. However, as various applications have various requirements, it may be challenging to produce light fixtures to meet the required specifications or configurations

SUMMARY

To address the challenges of efficiently providing light fixtures that meet specifications or design requirements of an application, the present solution provides a programmable light fixture. The light fixture may include a light source such as an LED. In some embodiments, the programmable light fixture of the present solution may include a custom driver, custom optic, or custom injected optic. The light fixture of the present solution may be approximately 3 inches wide, 1 inch tall, take 300 volt AC as input, and provide a granularity of 0.5 watt increments in the 6 to 14 watt range. In some embodiments, the output wattage of the light fixture may be adjusted, changed, or modified on-the-fly using a controller or driver or other programmable component. For example, the wattage may be adjusted from 10 watts per foot to 9.5 watts per foot. In some embodiments, dimming functionality may be built-in to the light fixture, as opposed to using an external interface.

At least one aspect is directed to a system to illuminate at least a portion ceiling. In some embodiments, the system can include a light fixture supported or attached to a wall or a ceiling. The light fixture can include a light source enclosed within the light fixture and configured to emanate light directionally away from the wall. The light fixture can include a protrusion. The protrusion can extend away from and below the light source. The protrusion can include a bent end that is bent upwards to direct light at a predetermined angle towards a ceiling. The light fixture can include an optic attached above the light source and extending above and externally towards the bent end of the protrusion. The optic can be configured to direct a portion of light towards the bent end.

In some embodiments, the bent end directs the light towards the ceiling at the predetermined angle. The predetermined angle of the bent end and the optic can be configured to spread light across at least the portion of the ceiling a predetermined distance away from the light fixture.

In some embodiments, the system can include a gap between an end of the optic and the bent end. In some embodiments, an end of the optic meets the bent end. The light fixture can extend perpendicularly from the wall and parallel from the ceiling.

In some embodiments, the light source includes a linear light source having a plurality of light emitting diodes (LEDs). The light source can include a linear light source having a plurality of light emitting diodes (LEDs). The optic can provide a light mixing chamber configured to mix light emitted by the plurality of LEDs. In some embodiments, the optic includes an asymmetric optic having a first portion at the light source thicker than a second portion at the bent end. The optic can be formed from a translucent acrylic.

Another aspect is directed to a method. The method can include attaching a light fixture to a wall or a ceiling. The light fixture can include a light source enclosed within the light fixture and configured to emanate light directionally away from the wall. The light fixture can include a protrusion. The protrusion can extend away from and below the light source. The protrusion can include a bent end that is bent upwards to direct light at a predetermined angle towards a ceiling. The light fixture can include an optic attached above the light source and extending above and externally towards the bent end of the protrusion, wherein the optic is configured to direct a portion of light towards the bent end.

In some embodiments, the bent end directs the light towards the ceiling at the predetermined angle. The predetermined angle of the bent end and the optic can be configured to direct a spread of light across the ceiling a predetermined distance from away from the light fixture. The light fixture can include a gap between the optic and the bent end. In some embodiments, the optic can meet the bent end.

In some embodiments, the method includes attaching the light fixture to the wall such that the light fixture extends perpendicular from the wall and parallel from the ceiling. The light source can include a linear light source having a plurality of light emitting diodes (LEDs).

Yet another aspect is directed to a method. The method can include a linear light source of a light fixture emanating light. The light fixture can be attached to a wall or a ceiling. The method can include an optic directing a portion of the light towards the bent end. The optic can be attached above the linear light source and extend above and externally towards a bent end of a protrusion of the light fixture extending away from and below the linear light source. The method can include the bent end projecting the directed light at a predetermined angle towards a ceiling.

In some embodiments, the linear light sources includes a plurality of light emitting diodes (LEDs), and the optic provides a light mixing chamber configured to mix light emitted by the plurality of LEDs. In some embodiments, the optic includes an asymmetric optic formed from translucent acrylic and having a first portion at the linear light source thicker than a second portion at the bent end.

BRIEF DESCRIPTION OF THE DRAWINGS

The foregoing and other objects, aspects, features, and advantages of the present invention will become more apparent and better understood by referring to the following description taken in conjunction with the accompanying drawings, in which.

The features and advantages of the present invention will become more apparent from the detailed description set forth below when taken in conjunction with the drawings, in which like reference characters identify corresponding elements throughout.

DETAILED DESCRIPTION

Apparatus, systems and methods of the present solution provide programmable light fixtures. In some embodiments, the programmable light fixture may be small in size, e.g., less than or equal to 3 inches wide, less than or equal to 1 inch tall. In some embodiments, the light fixtures may take as input 300 volt AC. In some embodiments, the light fixture may be programmable in that the light fixture can provide light output at a desired voltage. The light output may be measured in watts. The light output may further be measured as a watt per foot of the light fixture. In some embodiments, the granularity of adjustment of the light output may be 0.5 watts per foot increments. The adjustable light output may range from 6 to 14 watts per foot, in 0.5 watt increments, and may be adjusted on the fly without having to change a component of the light fixture. For example, a controller or other module of the light fixture may include software to adjust a light intensity based on a received instruction. The instruction may be received via a communication wire, power cable, or wirelessly.

Figure 1:
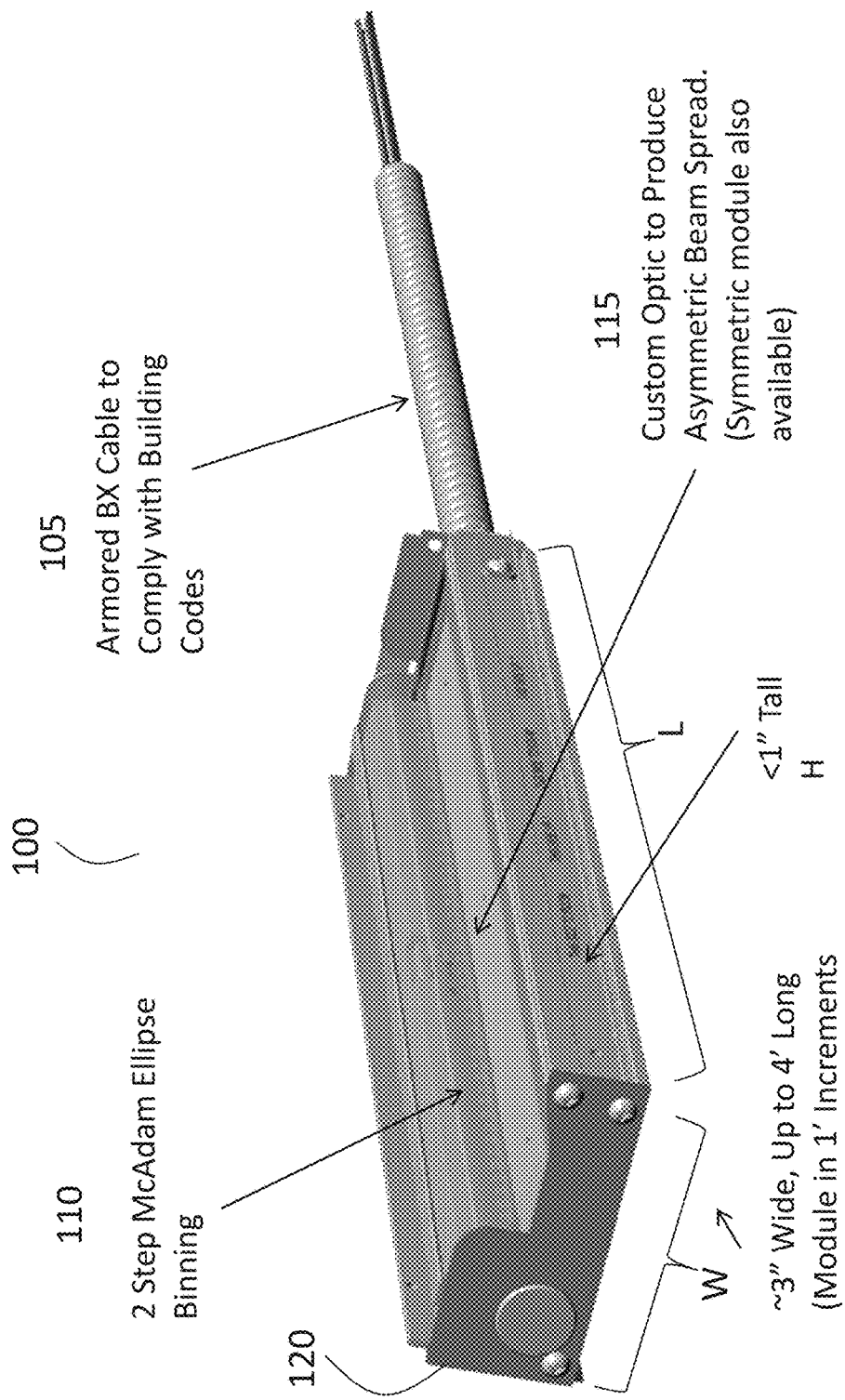
FIGS. 1-4 are diagrams depicting various perspective views of an example light fixture in accordance with an embodiment.

Referring now to FIG. 1, a diagram depicting an example light fixture in accordance with an embodiment is shown. In some embodiments, the light fixture 100 includes an optic 115, a light source 110, a power or communications cable 105, and an enclosure 120. The light source 110 may include any type of light source including. In some embodiments, light source includes a fluorescent light, lamp, light bulb, or one or more light emitting diodes of various colors (e.g., white, red, green, blue). In some embodiments, the light source is a semiconductor light emitting device, such as a light emitting diode of any spectral or wavelength range. In a plurality of embodiments, the light source is a broadband lamp or a broadband light source. In number of embodiments, the light source is a black light. In a plurality of embodiments, light source is a hollow cathode lamp. In a number of embodiments, light source is a fluorescent tube light source. In some embodiments, the light source is a neon or argon lamp. In a plurality of embodiments, light source is a plasma lamp. In certain embodiments, light source is a xenon flash lamp. In a plurality of embodiments, light source is a mercury lamp. In some embodiments, light source is a metal halide lamp. In certain embodiments, light source is a sulfur lamp. In a number of embodiments, light source is a laser, or a laser diode. In some embodiments, light source is an OLED, PHOLED, QDLED, or any other variation of a light source utilizing an organic material. In certain embodiments, light source is a monochromatic light source. In a number of embodiments, light source is a polychromatic light source. In a plurality of embodiments, light source is a light source emitting light partially in the spectral range of ultraviolet light. In some embodiments, light source is a device, product or a material emitting light partially in the spectral range of visible light. In a number of embodiments, light source is a device, product or a material partially emanating or emitting light in the spectral range of the infrared light. In a number of embodiments, light source is a device, product or a material emanating or emitting light in the visible spectral range. In some embodiments, light source includes a filter to control the spectral range of the light emitted from the light source. In certain embodiments, light source includes a light guide, an optical fiber or a waveguide through which light is emitted from the light source. In some embodiments, light source includes one or more mirrors for reflecting or redirecting of light. In some embodiments, lighting device or fixture 100 reflects light emitted from another light source. In some embodiments, light source includes a light reactive material affecting the light emitted, such as a polarizer, filter or a prism. In a plurality of embodiments, light source is a coherent light source. In some embodiments, light source, or a lighting device or fixture, is an incoherent light source.

In some embodiments, the light source 110 may include LEDs selected using a McAdam Ellipse Binning technique. Using this technique, the LEDs selected for use in the light fixtures may produce a light color that is uniformly perceived by a human. The color may be red, green, blue, white or a combination thereof.

The light fixture 100 may have a width W, a length L, and a height H. In some embodiments, the width W may be approximately 3 inches, the length L may be up to 4 feet long or include multiple light fixtures or modules that are in one foot increments, and the height may be less than 1 inch tall.

The light fixture 100 may include a custom optic 115. The custom optic 115 may include an asymmetric optic that can produce an asymmetric beam spread. In some embodiments, the optic may be a symmetrical optic to produce a symmetrical beam spread.

The light fixture 100 may connect to a second light fixture 100' (not shown) via a cable 105. The cable 105 may be include, in some embodiments, an armored BX cable. The cable may be any type of cable that complies with building codes. An armored BX cable may refer to a bundle of insulated wires sheathed in a sturdy metallic armor. The armored BX cable may deliver AC power or communication/control information.

Figure 2:
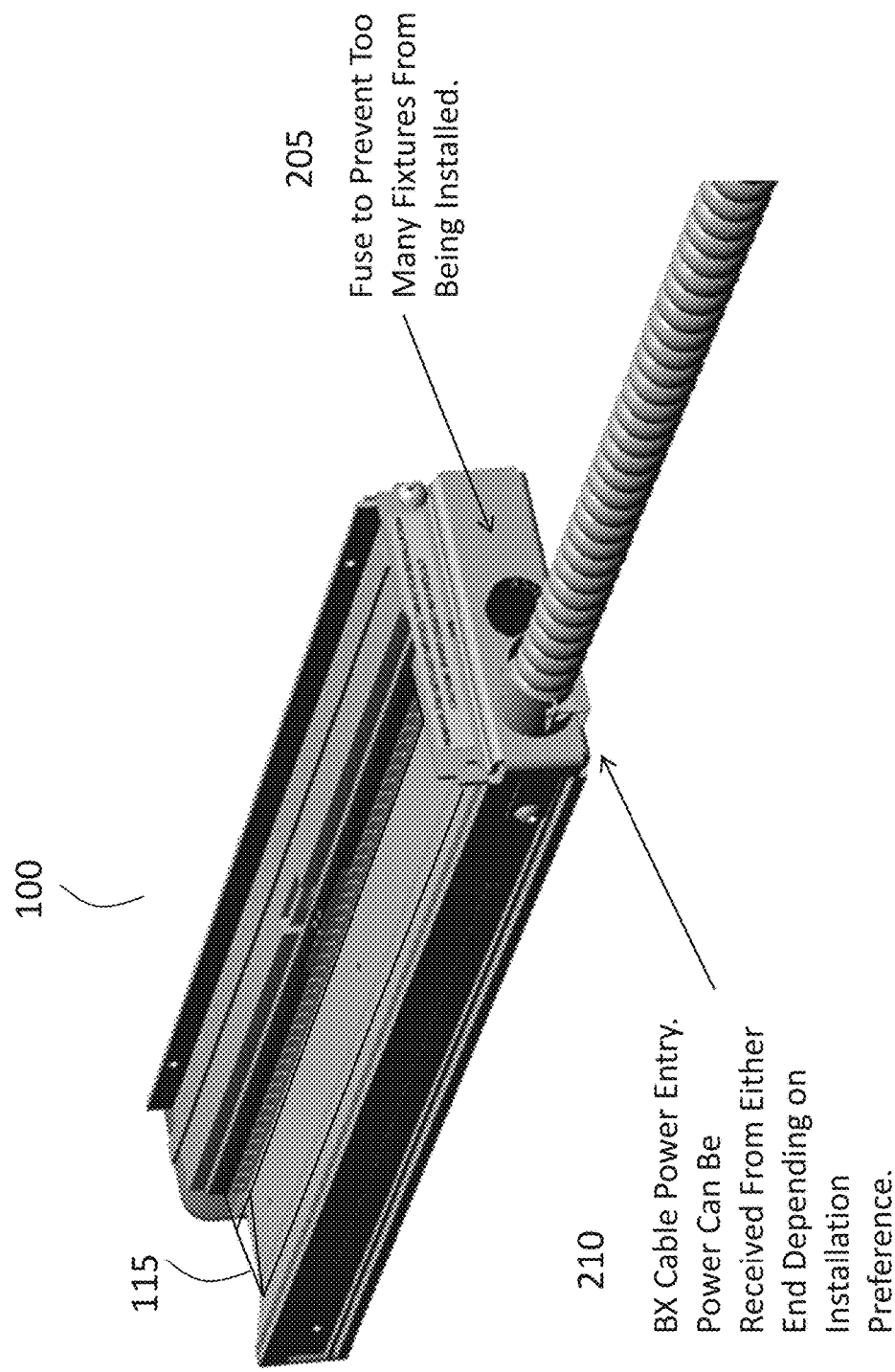

FIG. 2 shows a diagram depicting an example light fixture in accordance with an embodiment. The light fixture 100 can include a fuse 205 designed and constructed/configured to prevent too many fixtures from being installed. The light fixture 100 can include an armored BX cable power entry 210. This power entry 210 allows for power to be received from either end depending on the installation preference. The light fixture can include an optic 115 extending over a protrusion.

Figure 3:
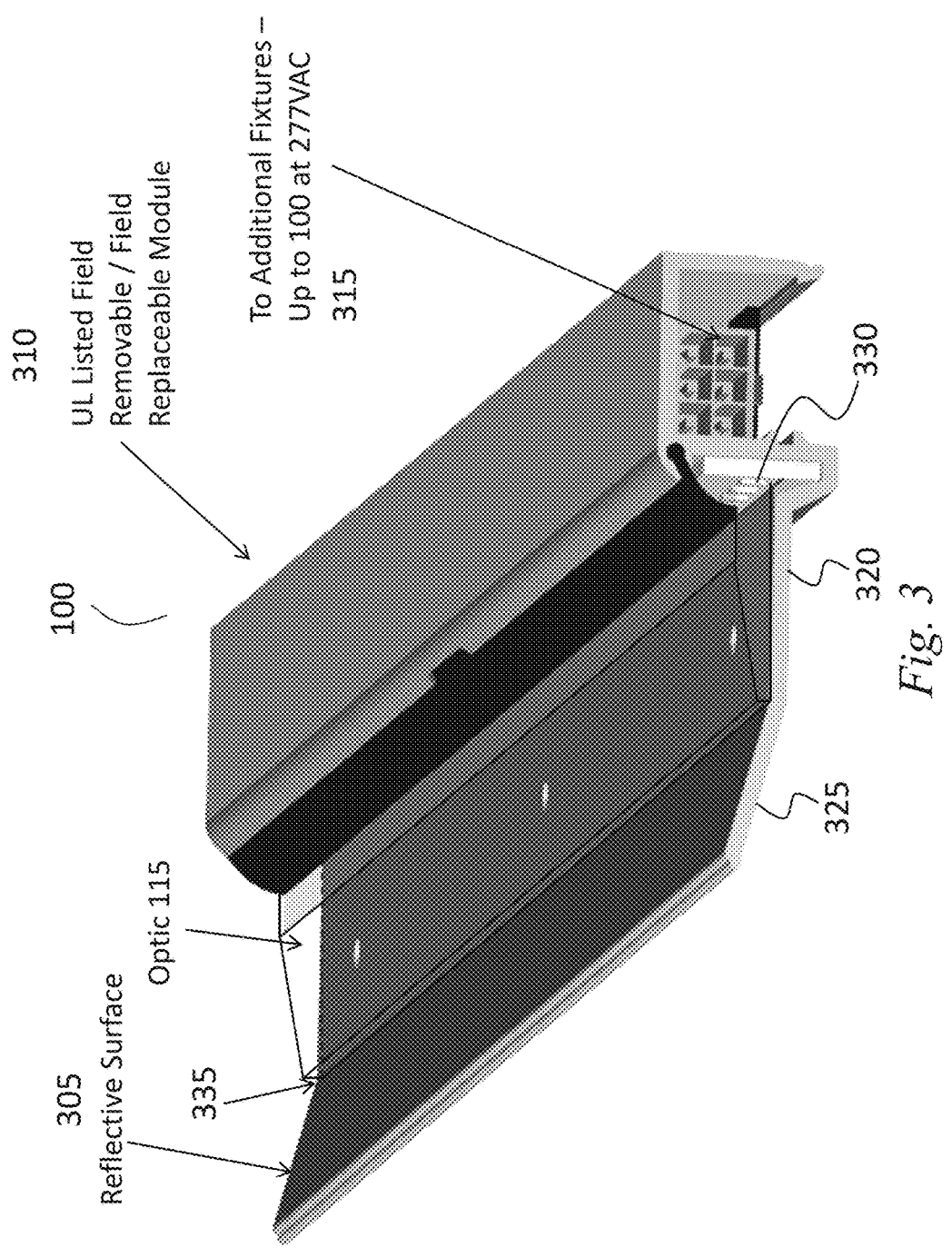

FIG. 3 shows a diagram depicting an example light fixture 100 in accordance with an embodiment. In some embodiments, light fixture 100 may include a reflective surface 305 that reflects light emitted by a light source. The reflective surface 305 can include a reflective coating. The reflective surface can reflect visible light. The light may be reflected onto another surface, such as a wall or ceiling other desired surface. In some embodiments, light fixture 100 may include a field replaceable module (e.g., a light source, driver, controller, or other component of the light fixture). The light fixture 100 may include an interface 315 or port 315 that allows the light fixture 100 to be connected to one or more additional light fixture. In some embodiments, the light fixture interface 315 allows the light fixture to be connected to up to 100 additional light fixtures that take as input 277 VAC power.

The light fixture can include a light source 330. The light source 330 can include one or more light emitting diodes (LEDs). For example, the light source 330 can include a linear light source. A linear light source can refer to a light source whose dimension along a line is significantly greater than its other dimensions. An example of a linear lights source can include a fluorescent lamp, or string or row of LEDs.

The light fixture 100 can include a protrusion, such as protrusion 320. The protrusion 320 can extend away from and below the light source 330. At least a portion of the protrusion 320 can extend in a direction that is parallel to the direction of a light beam emitted from the light source 330. The protrusion 320 can include a bent end 325. The bent end 325 can be bent upwards to direct light at a predetermined angle towards a ceiling. The bent end 325 can direct the light upwards, such as towards a ceiling, at the predetermined angle. The angle can be determined based on the angle formed between the protrusion 320 and the bent end 325.

The light fixture can include an optic 115. The optic 115 can be attached above the light source 330. The optic 115 can extend above and externally towards the bent end 325 of the protrusion 320. The optic 115 can be configured to direct a portion of light towards the bent end 325. The predetermined angle of the bent end 325 and the optic 115 (e.g., where the bent end 325 meets an end of the optic 115) can be configured to spread light upwards across at least a portion of a ceiling a predetermined distance away from the light fixture.

The optic 115 can provides a light mixing chamber configured to mix light emitted by the light source 330. The optic 115 can include an asymmetric optic having a first portion at the light source 330 thicker than a second portion at the bent end 325. In some embodiments, the optic 115 can be formed from a translucent acrylic. The optic 115 can be formed of a diffuse reflectance material to provide uniform Lambertian distribution. The translucent acrylic can facilitate providing a color mixing chamber that can improve or optimize color and spatial mixing of the light emitted by the LEDs. The optic 115 comprising the light mixing chamber can provide a light beam that is substantially uniform with regard to color and brightness across the exit aperture of the optic 115.

In some embodiments, the light fixture can include a gap 335 between an end of the optic 115 and the bent end 325. The gap 335 can allow more light to pass through as relative to the optic 115. The gap 335 can facilitate emitting light at a greater intensity as compared to the optic, which may be translucent but dim the light. In some embodiments, the end of the optic 115 can meet the bent end 335, thus reducing the intensity of light emitted via the light fixture.

Figure 4:
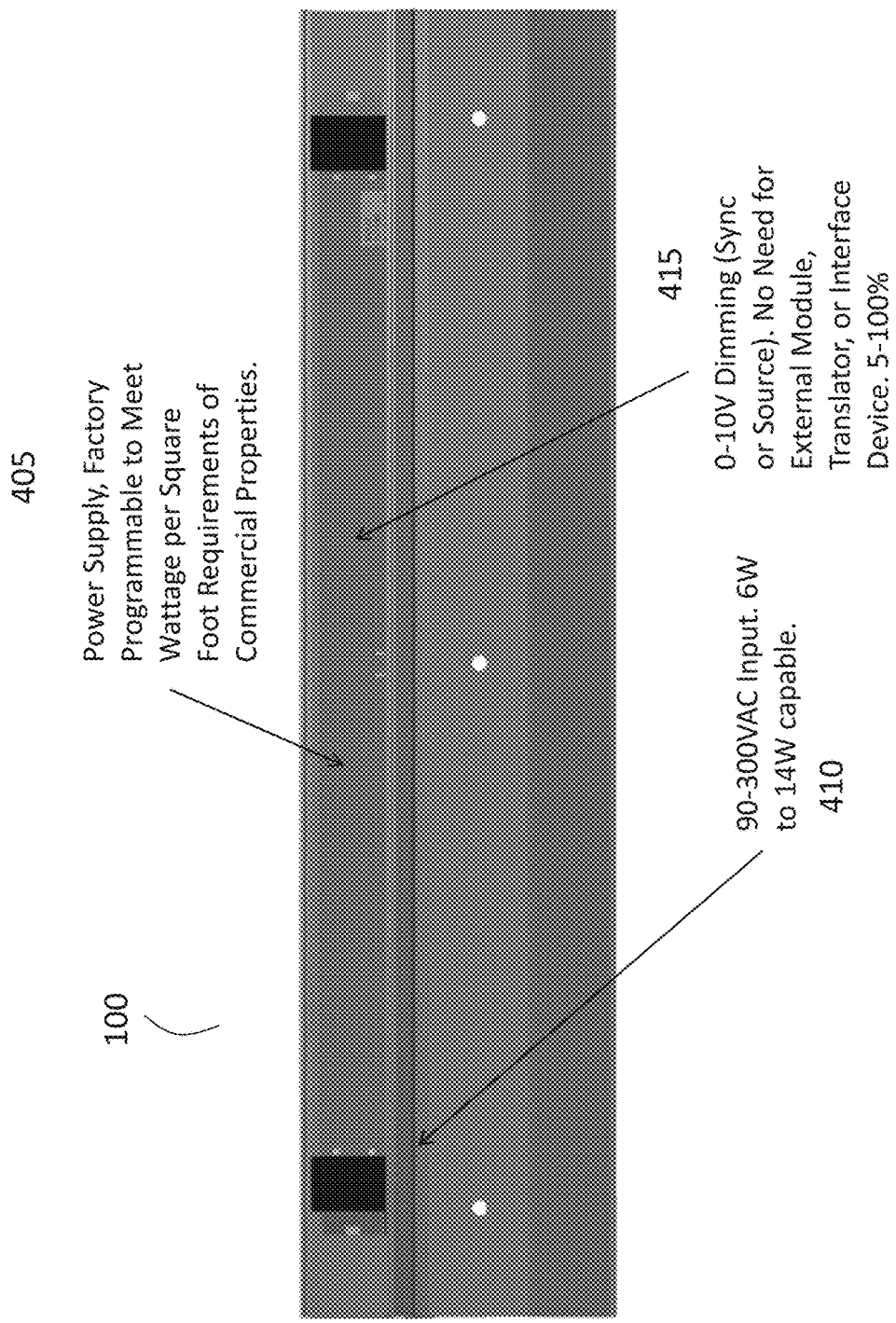

FIG. 4 shows a diagram depicting an example light fixture in accordance with an embodiment. In some embodiments, the light fixture 100 can include a power supply 405. The power supply can be programmable. In some embodiments, the power supply may be programmed at a factory where the light fixture 100 or component thereof is manufactured or assembled. The power supply can be programmed to satisfy or meet a wattage per square foot requirement of an environment, such as a building, room, or other area.

In some embodiments, the light fixture 100 can include a dimmer 415. The dimmer can provide 0 to 10 volt dimming.

The dimmer 415 may include a sync or source dimmer. The dimmer 415 be included in the light fixture, integral to the light fixture, coupled to the light fixture or otherwise part of the light fixture 100. The dimmer 415 can provide 5 to 100% dimming.

The light fixture 100 can be designed and constructed to receive 90-300 VAC power input from a power wire or connection 410, and output light from 6 to 14 watts per square foot in 0.5 watt increments.

In some embodiments, the light fixture 100 includes a driver/controller ("controller") designed and constructed to provide power to a light source. The controller may be configured to receive an intensity setting and accordingly generate a signal to power a light source such that the light source emits light at the corresponding intensity level setting. The controller may include a light emitting diode ("LED") driver such as a Step-Down LED driver with part number LT3474. In some embodiments, the controller can adjust the intensity level of the LED by adjusting the duty-cycle (e.g., pulse width modulation or digital patterns) of a power signal (e.g., voltage or current).

In many embodiments, the controller includes any unit, system, device or component capable of controlling, modulating light emitted or emanated from any light source. In some embodiments, controller includes software, hardware, or any combination of software and hardware for controlling, managing or otherwise directing the operation and/or performance of one or more light source. Controller may include any type and form of logic, electronic circuitry, logic operations or functions, software or hardware embodied in forming instructions or enabling control of one or more light source. In some embodiments, controller comprises any type and form of digital and/or analog circuitry, any device, system, unit or a program for performing any of the operations described herein. Controller may include any type and form of executable instructions, including an application, a program, a library, a process, a service, a task or a thread. In one implementation, controller provides, includes or controls power output for one or more of light source, light emanated from a light source or light produced from a light source.

In some embodiments, controller is any unit used for controlling one or more light sources responsive to an instruction or setting for intensity or color. Sometimes, controller is any device, system, structure, circuit, piece or hardware or software used for controlling a light source or any other lighting system component. In a plurality of embodiments, controller comprises a combination of any device, system structure, circuit, piece of hardware or software, computer program, structure or algorithm used for controlling a light source or any other lighting system component. In some embodiments, controller includes logic, functions or operations to establish, determine, adapt, coordinate, manage or control any characteristics of light emitted from one or more light source based on a received intensity or color setting. In numerous embodiments, controller includes logic, functions or operations to establish, determine, adapt, coordinate, manage or control, responsive to a manager, any characteristics of any output of any lighting system component. In a plurality of embodiments, controller controls a light source which produces a light of a predetermined wavelength. In another implementation, the controller directs the light source to emit a light having a wavelength in a predetermined range. In some embodiments, the controller directs the light source to emanate a light at a predetermined frequency or within a predetermined frequency range. In other embodiments, controller adjusts one or more characteristics of the light to be emitted or emanated from the light source. In a plurality of embodiments, controller establishes or adjusts the color and/or color temperature of the light to emanate from the light source. For example, the color may be established or adjusted based on a color rendering index or value thereof. In another example, the color temperate may be established or adjusted based on a temperature value, such as for example, Kelvin scale. In some embodiments, controller comprises functionality for detecting, or detects a duty cycle of a signal.

Lighting fixture may be any system including one or more lighting devices or light sources. Sometimes, the system includes one or more light sources or light fixtures controlled by one or more lighting system components. In a plurality of embodiments, a lighting system includes a number of light source connected to each other. In a number of embodiments, a lighting system includes a number of light sources connected to a power supply receptacle or a source of electricity, such as an electrical outlet. In many embodiments, lighting system is a system comprising a plurality of light sources or other lighting system components connected to each other and communicating with each other. In a number of embodiments, lighting system comprises a plurality of lighting system components electrically connected to each other in series or parallel via connector. In some embodiments, lighting system comprises a plurality of lighting system components electrically connected to each other in series. In a plurality of embodiments, lighting system comprises components, such as light sources connected to each other in parallel or in series or in a combination of parallel and series electrical connections. Sometimes, lighting system includes any number of systems, products, components or devices assisting any functionality, operation or control of light sources. In a number of embodiments, lighting system includes one or more components, systems, products or devices assisting or controlling communication between a light source and another light source or another component, device, system or product. In a plurality of embodiments, lighting system is any system comprising a plurality of light sources, such as light fixtures for example, illuminating or lighting an area or a space. In many embodiments, lighting system is any system comprising a plurality of light sources, providing illumination or lighting an area or a space as controlled by one or more lighting system components.

Figure 5:
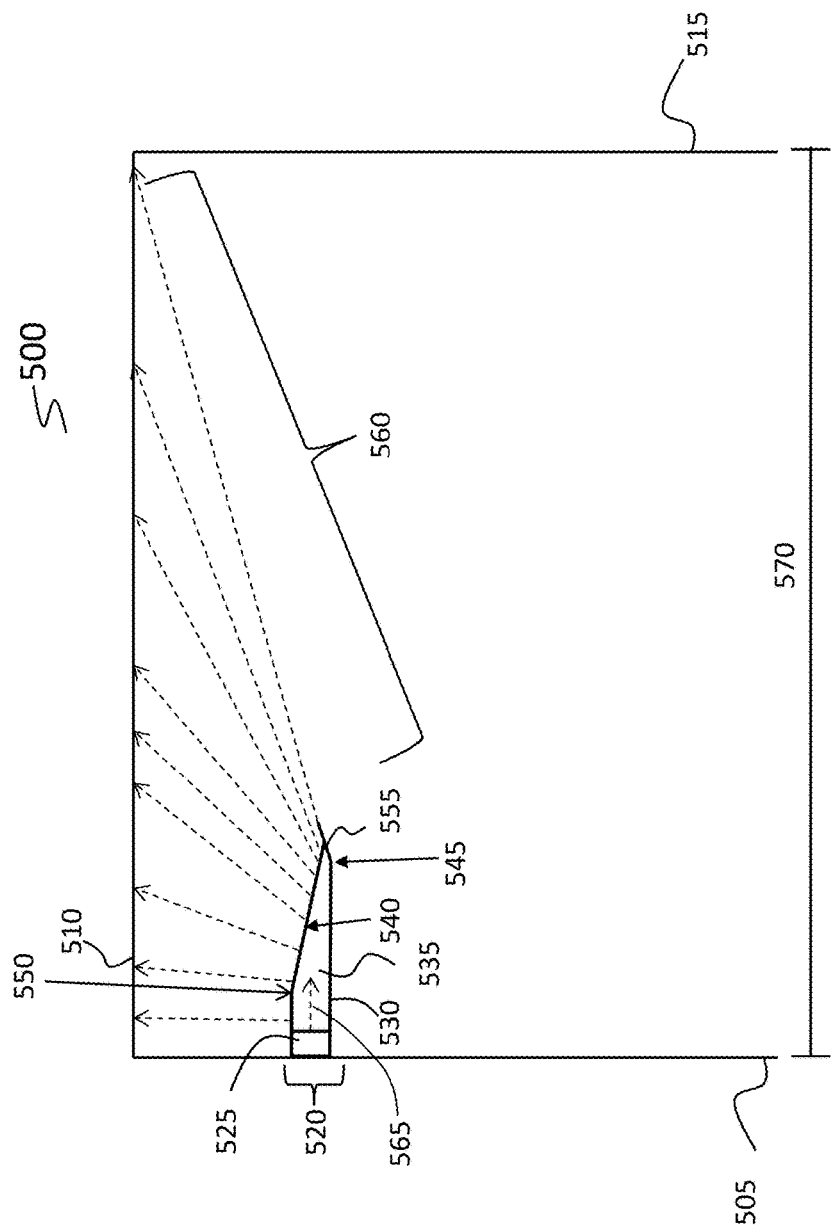
FIG. 5 is a diagram depicting a system to illuminate at least a portion of a ceiling, in accordance with an embodiment.

FIG. 5 is a diagram depicting a system 500 to illuminate at least a portion of a ceiling 510, in accordance with an embodiment. The system 500 an include a light fixture 520. The light fixture 520 can include one or more component or functionality of light fixture 100 illustrated and described in FIGS. 1-4. The light fixture 520 can be supported at or near a wall 505 or a ceiling 510. The light fixture 520 can be supported at or near the wall 505 or the ceiling 510 by attaching the light fixture 520 to the wall 505 or the ceiling 510. The light fixture 520 can be attached to the wall 505 or the ceiling 510 using one or more of screws, nuts, bolts, nails, adhesives, hooks, fasteners, magnets, grooves, pins, or other type of mechanical or electromechanical coupling mechanisms to fixedly or securely attach the light fixture 520 to the wall 505. In some cases, the light fixture 520 can be attached to the ceiling 510. For example, the light fixture 520 can be suspended from the ceiling 510 via a rod, wire, beam, metal, wood, plastic, or other suspension mechanism. In some cases, the light fixture can be supported by a supporting member or structure (e.g., a pedestal) via a floor. The light fixture 520 can extend perpendicular from the wall 505 and parallel from the ceiling 510. For example, attaching the light fixture 520 to the wall 505 can include attaching the light fixture 520 to the wall 505 such that the light fixture 520 extends perpendicular from the wall and parallel from the ceiling.

The light fixture 520 can include a light source 525. The light source 525 can include one or more component or functionality of light source 330, such as a linear light source. The light source 525 can include multiple LEDs, such as 10, 20, 30, 40, 50, 60 or more LEDs. The light source 525 can be enclosed within the light fixture 520. Emanating light from the light source can include activating or driving the LEDs of the light source by supplying current or power to the LEDs via an LED driver or controller. The light source 525 can emanate light directionally away from the wall, as illustrated by an arrow in FIG. 500. The light fixture 520 can include a protrusion 530 (e.g., similar to protrusion 320) that extends away from and below the light source 525. The protrusion 530 can have a bent end 555. The bent 555 can be bent upwards to direct light at a predetermined angle towards the ceiling 510. The angle can be predetermined based on a length of the ceiling 510 based on a distance 570 between the wall 505 and the wall 515. The bent end can project the directed light 560 at a predetermined angle towards a ceiling.

The light fixture 520 can include an optic 535 attached above the light source 525 and extending above and externally towards the bent end 555 of the protrusion 530. The optic 535 can be configured to direct a portion of light emitted by the light source 525 towards the bent end 555. The light fixture 520 can spread light 560 across the ceiling 510. For example, light can pass through portions of the optic 535 and reflect off the bent end 555 towards the ceiling 510. The optic can include an asymmetric optic having a first portion at or closer to the light source 525 that is thicker than a second portion at the bent end 555. The portion 550 of the optic 535 closer to the light source 525 can be thicker in order to reduce the intensity of light provided at the portion of the ceiling 510 closer to the light fixture 520. The portion 540 of the optic 535 closer to the bent end 545 or 555 can be thinner in order to allow more light to pass through the optic at that portion, thereby directing more light towards a portion of the ceiling 510 that is further from the light fixture. For example, the portion 540 of the optic 535 can become increasingly thinner as the optic 535 approaches the bent end 555. By configuring the optic 535 with different thicknesses at different portions, the light fixture 520 can provide a more even spread of light across the ceiling 510, where the spread of light has a substantially even intensity at portions across the ceiling 510.

The bent end 555 can direct the light towards the ceiling at a predetermined angle 545 formed between the protrusion 530 and the bent end 555. For example, the light fixture 520 can be configured to spread light 560 onto a ceiling having a length 570. Thus, the predetermined angle 545 of the bent end and the optic are configured to spread light across at least the portion of the ceiling a predetermined distance away from the light fixture. In some embodiments, the end of the optic 535 can meet the bent end 555.

Figure 6:
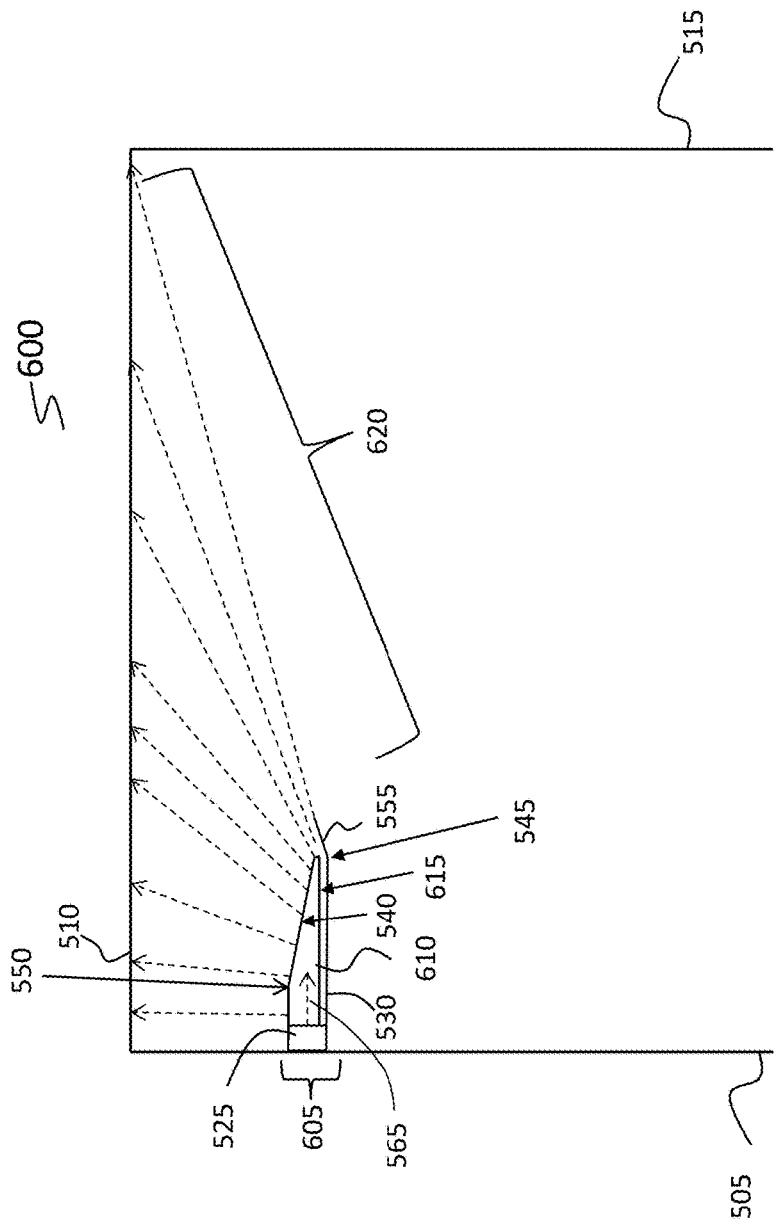
FIG. 6 is a diagram depicting a system to illuminate at least a portion of a ceiling, in accordance with an embodiment.

FIG. 6 is a diagram depicting a system 600 to illuminate at least a portion of a ceiling 510, in accordance with an embodiment. The system 600 can include one or more component or function of system 500. The light fixture 605 of system 600 includes a gap 615 between the optic 610 and the protrusion 530. The gap 615 can facilitate emitting more light from the light source 525 towards the bent end 555, while reducing an amount of light emitted through portions of the optic towards portions of the ceiling 510 closer to the light fixture. Thus, the light fixture 605 can provide a spread of light 620 that can have increased intensity to provide an even spread of light 620 across portions of a ceiling 510. By emitting more light at the bent end 555, the light fixture 605 can provide an even spread of light across a ceiling with a greater length.

Figure 7:
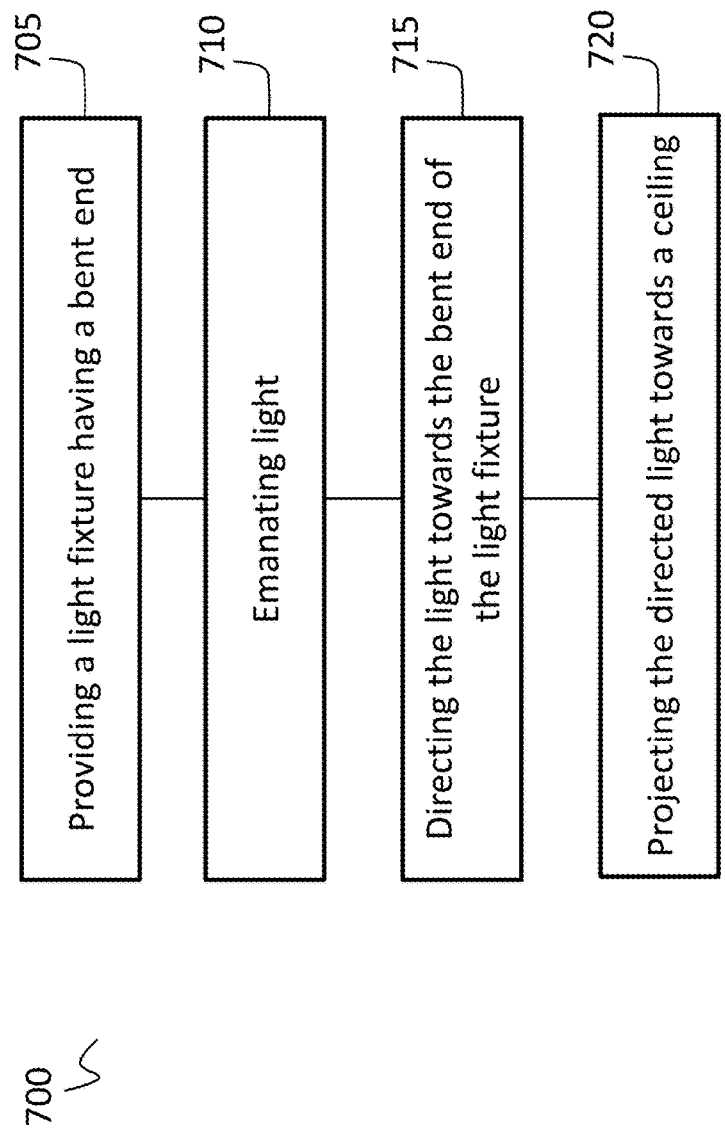
FIG. 7 is a flow chart depicting a method of illuminating at least a portion of a ceiling, in accordance with an embodiment.

FIG. 7 is a flow chart depicting a method of illuminating at least a portion of a ceiling, in accordance with an embodiment. The method 700 can be performed by one or more component or system depicted in FIGS. 1-6. The method 700 can include providing a light fixture having a bent end at step 705. The light fixture can be provided at a wall or a ceiling. The light fixture can be attached to the wall or ceiling. The wall might include one or more windows, dry wall, paint, brick, cement, wood, glass, plastic, etc. The light fixture can be coupled to the wall or the ceiling. The light fixture can be removebly coupled to the wall or the ceiling. The light fixture can be mechanically coupled to the wall or the ceiling. In some cases, providing the light fixture at the wall or the ceiling can include placing the light fixture on a pedestal to support the light fixture at or near the wall or the ceiling, or in a manner that allows the light fixture to project light towards the ceiling.

At step 710, the light fixture emanates light. The light fixture can include a light source (e.g., linear light source) enclosed within the light fixture. The light source can emanate the light directionally away from the wall. For example, the light source can include a light bulb or LED that emits light. At least some of the emitted light can be emitted in a direction that is away from the wall.

At step 715, the light fixture directs the light towards a bent end of the light fixture. For example, the light fixture can include an optic attached above the light source. The optic can extend above a protrusion that extends from the light fixture. The optic can extend towards a bent portion of the light fixture that extends away from and below the linear light source. A portion of the bent end can extend from below a portion of the light source to above a portion of the light source. The optic can direct the light towards the bent end.

At step 720, the light fixture projects the directed light towards a ceiling. For example, the bent end can direct the light at a predetermined angle towards the ceiling. The angle can be predetermined based on the design of the light fixture. The angle can be predetermined such that light can be spread to a desired portion of the ceiling.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "tool" or "computing device" or "system" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular embodiments of particular inventions. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A system to illuminate at least a portion of a ceiling, comprising:
    a light fixture, supported at a wall or a ceiling, comprising
        a light source enclosed within the light fixture and configured to emanate light directionally away from the wall towards at least a portion of the ceiling;
        a protrusion of the light fixture extending away from and below the light source, wherein a bent end of the protrusion is bent upwards to direct light at a predetermined angle towards a ceiling, a first end of the protrusion positioned at the light source, and the bent end of the protrusion is opposite the first end of the protrusion and thinner than the first end of the protrusion; and
        an optic attached above the light source and extending above and externally towards the bent end of the protrusion, wherein the optic is configured to direct a portion of light towards the bent end.

2. The system of claim 1, wherein the bent end directs the light towards the ceiling at the predetermined angle.

3. The system of claim 1, wherein the predetermined angle of the bent end and the optic are configured to spread light across at least the portion of the ceiling a predetermined distance away from the light fixture.

4. The system of claim 1, comprising a gap between an end of the optic and the bent end.

5. The system of claim 1, wherein an end of the optic meets the bent end.

6. The system of claim 1, wherein the light fixture is attached to the wall or the ceiling and extends perpendicular from the wall and parallel from the ceiling.

7. The system of claim 1, wherein the light source comprises a linear light source having a plurality of light emitting diodes (LEDs).

8. The system of claim 1, wherein the light source comprises a linear light source having a plurality of light emitting diodes (LEDs), and the optic provides a light mixing chamber configured to mix light emitted by the plurality of LEDs.

9. The system of claim 1, wherein the optic comprises an asymmetric optic having a first portion at the light source thicker than a second portion at the bent end.

10. The system of claim 1, wherein the optic is formed from a translucent acrylic.

11. A method of illuminating a ceiling, comprising:
    providing a light fixture at a wall or a ceiling, the light fixture comprising a light source enclosed within the light fixture and configured to emanate light directionally away from the wall, wherein the light fixture includes:
        a protrusion of the light fixture extending away from and below the light source, wherein a bent end of the protrusion is bent upwards to direct light at a predetermined angle towards the ceiling, a first end of the protrusion positioned at the light source, and the bent end of the protrusion is opposite the first end of the protrusion and thinner than the first end of the protrusion; and
        an optic attached above the light source and extending above and externally towards the bent end of the protrusion, wherein the optic is configured to direct a portion of light towards the bent end.

12. The method of claim 11, wherein the bent end directs the light towards the ceiling at the predetermined angle.

13. The method of claim 11, wherein the predetermined angle of the bent end and the optic are configured to direct a spread of light across the ceiling a predetermined distance from away from the light fixture.

14. The method of claim 11, wherein the light fixture comprises a gap between the optic and the bent end.

15. The method of claim 11, wherein the optic meets the bent end.

16. The method of claim 11, comprising attaching the light fixture to the wall such that the light fixture extends perpendicular from the wall and parallel from the ceiling.

17. The method of claim 11, wherein the light source comprises a linear light source having a plurality of light emitting diodes (LEDs).

18. A method of illuminating a ceiling, comprising:
   emanating, by a linear light source of a light fixture attached to a wall or a ceiling, light;
   directing, by an optic attached above the linear light source and extending above and externally towards a bent end of a protrusion of the light fixture extending away from and below the linear light source, a portion of the light towards the bent end, a first end of the protrusion positioned at the linear light source, and the bent end of the protrusion is opposite the first end of the protrusion and thinner than the first end of the protrusion; and
   projecting, by the bent end, the directed light at a predetermined angle towards the ceiling.

19. The method of claim 18, wherein the linear light sources comprises a plurality of light emitting diodes (LEDs), and the optic provides a light mixing chamber configured to mix light emitted by the plurality of LEDs.

20. The method of claim 18, wherein the optic comprises an asymmetric optic formed from translucent acrylic and having a first portion at the linear light source thicker than a second portion at the bent end.

* * * * *